US012729113B2

(12) United States Patent
Myers et al.

(10) Patent No.: US 12,729,113 B2
(45) Date of Patent: Sep. 8, 2026

(54) CLEAN HYDROGEN PRODUCTION THROUGH THE SULFUR-IODINE CYCLE

(71) Applicant: Inventus Holdings, LLC, Juno Beach, FL (US)

(72) Inventors: Madison C. Myers, West Palm Beach, FL (US); Richard P. Clark, Palm Beach Gardens, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 529 days.

(21) Appl. No.: 18/365,462

(22) Filed: Aug. 4, 2023

(65) Prior Publication Data

US 2025/0042728 A1 Feb. 6, 2025

(51) Int. Cl.
*C01B 3/103* (2026.01)
*B01J 19/00* (2006.01)
(Continued)

(52) U.S. Cl.
CPC ........... *C01B 3/103* (2026.01); *B01J 19/0013* (2013.01); *B01J 19/02* (2013.01); *B01J 19/2455* (2013.01); *C01B 3/06* (2013.01); *B01J 2219/00063* (2013.01); *B01J 2219/00135* (2013.01); *B01J 2219/0218* (2013.01); *B01J 2219/0272* (2013.01); *C01B 2203/0272* (2013.01); *C01B 2203/085* (2013.01); *C01B 2203/1623* (2013.01); *C01B 2203/84* (2013.01)

(58) Field of Classification Search
CPC . B01J 9/02; B01J 9/0013; B01J 9/0053; B01J 9/2455; B01J 2219/00063; B01J 2219/00135; B01J 2219/0227; B01J 2219/0218; B01J 2219/0272; C01B 3/103; C01B 2003/0272; C01B 2003/085; C01B 2003/1623; C01B 2003/84
See application file for complete search history.

(56) References Cited

U.S. PATENT DOCUMENTS

2015/0316328 A1 11/2015 Trainham et al.

OTHER PUBLICATIONS

Dan, "Sulfur-Iodine Thermochemical Cycle for Hydrogen Production," Thesis for the Degree of Bachelor of Chemical and Technical Engineering, Central Ostrobothnia University of Applied Sciences, Jun. 2009, 27 pages.

(Continued)

*Primary Examiner* — Lessanework Seifu
(74) *Attorney, Agent, or Firm* — Fish & Richardson P.C.

(57) ABSTRACT

A system for producing hydrogen includes a thermally insulated chamber including a sidewall formed of thermally insulative material and heating elements embedded in the sidewall. The heating elements are coupled to an intermittent power source, and the heating elements heat an interior of the thermally insulated chamber responsive to electrical power from the intermittent power source. The thermally insulated chamber includes an inlet port for receiving sulfuric acid from a sulfur-iodine chamber, a first outlet port for piping sulfur dioxide into the sulfur-iodine chamber and a second outlet port for piping hydrogen and water into a water condenser. The system includes a controller that controls electrical power from the intermittent power source to the heating elements based on an interior temperature of the thermally insulated chamber. The thermally insulated chamber impedes a decay of the interior temperature for an interval of time that the intermittent power source is unavailable.

17 Claims, 5 Drawing Sheets

(51) Int. Cl.
*B01J 19/02* (2006.01)
*B01J 19/24* (2006.01)
*C01B 3/06* (2006.01)

(56) References Cited

OTHER PUBLICATIONS

Pickard, "2005 DOE Hydrogen Program Review—Sulfur-Iodine Thermochemical Cycle," Sandia National Labs, May 25, 2005, retrieved from <https://www.hydrogen.energy.gov/pdfs/review05/pd27_pickard.pdf>, 24 pages.

Terada et al., "Development of Hydrogen Production Technology by Thermochemical Water Splitting IS Process Pilot Test Plan," Journal of Nuclear Science and Technology, Mar. 2007, 44(3):477-482.

Juárez-Martínez, et al.: "Energy optimization of a Sulfure-Iodine thermochemical nuclear hydrogen production cycle"; Nuclear Engineering and Technology 53 (2021) 2066-2073.

Gianconia, et al.: "Hydrogen/methanol production by sulfur-iodine thermochemical cycle powered by combined solar/fossil energy"; International Journal of Hydrogen Energy 32 (2007) 469-481; available online @ www.schiencedirect.com.

CLEAN HYDROGEN PRODUCTION THROUGH THE SULFUR-IODINE CYCLE

TECHNICAL FIELD

The present disclosure relates to clean hydrogen production. More particularly, this disclosure relates to clean hydrogen production through the sulfur-iodine cycle with a thermal storage.

BACKGROUND

Clean hydrogen is hydrogen produced using methods that curtail greenhouse gas emissions, such as using green energy sources, renewable energy sources, carbon capture and storage (CCS) technology or nuclear energy. This form of hydrogen has a wide range of applications, including as a fuel for transportation, as a feedstock for industrial processes, and as a source of energy for power generation. The production and use of clean hydrogen can help to reduce greenhouse gas emissions and support the transition to a more sustainable, low-carbon energy system.

The sulfur-iodine cycle (S-I cycle) is a three-step thermochemical cycle used to produce hydrogen. The S-I cycle has three chemical reactions with a net reactant of water and net products of hydrogen and oxygen. Other chemicals in the S-I cycle are recycled.

SUMMARY

A first example relates to a system for producing hydrogen, the system includes a thermally insulated chamber. The thermally insulated chamber includes a sidewall formed of thermally insulative material and heating elements embedded in the sidewall. The heating elements are coupled to an intermittent power source, and the heating elements heat an interior of the thermally insulated chamber responsive to electrical power from the intermittent power source. The thermally insulated chamber includes an inlet port for receiving sulfuric acid from a sulfur-iodine chamber, a first outlet port for piping sulfur dioxide into the sulfur-iodine chamber and a second outlet port for piping hydrogen and water into a water condenser. The system includes a controller that controls a flow of electrical power from the intermittent power source to the heating elements based on an interior temperature of the thermally insulated chamber. The thermally insulated chamber is designed to impede a decay of the interior temperature for an interval of time that the intermittent power source is unavailable. Thus, the interior temperature remains at or above a threshold temperature sufficient to decompose the sulfuric acid into the sulfur dioxide, oxygen and hydrogen for a sulfur-iodine cycle over a discharge time responsive to the thermally insulated chamber being heated for a charge time.

Another example relates to a method of producing hydrogen, the method includes controlling electrical power from a green energy power source that provides intermittently available power to a heater including heating elements embedded in a sidewall of a thermally insulated chamber of a vessel to heat the thermally insulated chamber for a charge time, causing the thermally insulated chamber to remain at or above a threshold temperature for a discharge time. The threshold temperature is sufficient to decompose sulfuric acid in the thermally insulated chamber into sulfur dioxide, water and oxygen as a constituent reaction of a sulfur-iodine cycle. The thermally insulated chamber is designed to impede a decay of an interior temperature for an interval of time that electrical power from the green energy power source is unavailable. Thus, the interior temperature remains at or above the threshold temperature over the discharge time responsive to the thermally insulated chamber being heated for the charge time.

DETAILED DESCRIPTION

Figure 1:
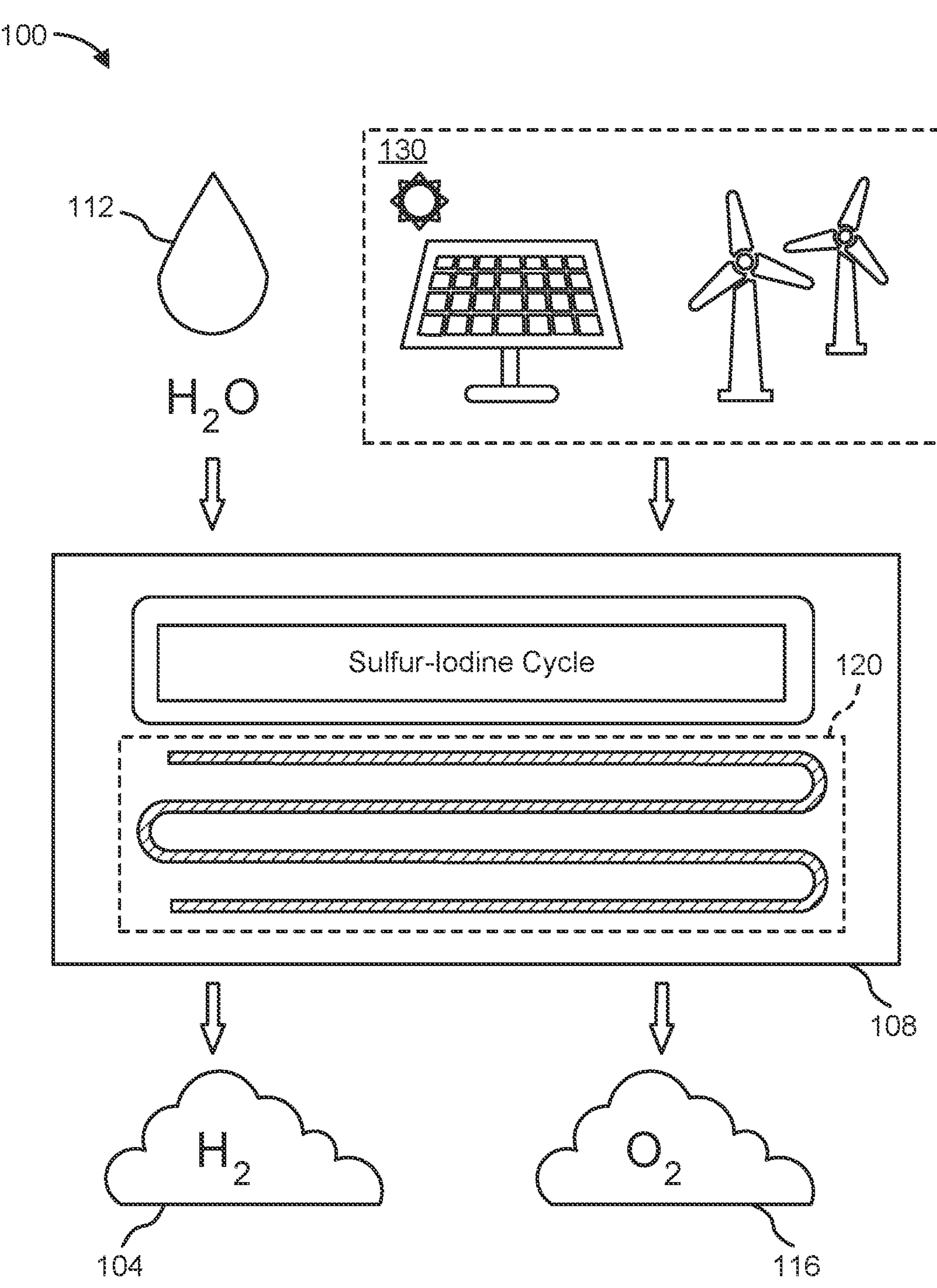
FIG. 1 illustrates a system for producing hydrogen ($H_2$), such as clean hydrogen.

This description is related to systems and methods to produce clean hydrogen ($H_2$) through the sulfur-iodine cycle, alternatively referred to as the S-I cycle. The system includes a vessel having a thermally insulated chamber, a sulfur iodine chamber and a hydrogen iodine chamber for chemical reactions of the S-I cycle. The system also includes a green energy power source, such as wind turbines, solar panels and/or hydroelectric turbines. The thermally insulated chamber has a high specific heat capacity and mass, indicating that the thermally insulated chamber can store a large amount of heat efficiently. This high specific heat capacity and mass enables the thermally insulated chamber to sustain high temperatures, even in situations where the thermally insulated chamber is provided heat on an intermittent basis.

The system includes a controller (e.g., a microcontroller with embedded instructions) that determines a threshold amount of heat energy needed to keep an interior temperature of the thermally insulated chamber of the vessel at or above a first threshold temperature (830° C.; 1526° F.) over an interval of time (e.g., 24 hours, 12 hours, 6 hours, etc.). The first threshold temperature is sufficient to decompose sulfuric acid ($H_2SO_4$) in the thermally insulated chamber into sulfur dioxide ($SO_2$), water ($H_2O$) and oxygen ($O_2$). The vessel includes piping, such that the vessel is configured to pipe the sulfur dioxide into the sulfur iodine chamber of the vessel that houses iodine and to pipe the oxygen ($O_2$) and the water ($H_2O$) from the thermally insulated chamber to a water condenser. The water condenser is coupled to an input water source.

The controller controls electrical current from the green energy power source applied to a heater for resistive elements embedded in a sidewall of the thermally insulated chamber of the vessel to produce the threshold amount of heat energy during an interval of time (e.g., 24 hours, 12 hours, 6 hours, etc.). In some examples, the controller also controls a flow of water to a water condenser. The water flows from the water condenser to the sulfur iodine chamber, such that iodine ($I_2$), the sulfur dioxide ($SO_2$) and the water ($H_2O$) in the sulfur iodine chamber decompose into the sulfuric acid ($H_2SO_4$) and hydrogen iodine (HI).

As one example, the thermally insulated chamber of the vessel can be charged for a charge time (during intervals of time that power is available from the green energy power source) that is an time interval time of about 4 hours (or a different interval of time in another example) and followed by a discharge time (e.g., unheated because power from the green energy power source is unavailable) that is an interval of time about 20 hours (or a different interval of time in another example). The charge time and the discharge time are based on a hydrogen production rate, a specific heat capacity and a mass of the thermally insulated chamber. In such a situation, the system can produce about of hydrogen over the discharge time. For instance, the charge time can occur in response to the thermally insulated chamber reaching 1030° C. (about 200° C. above the first threshold.

The vessel is configured to pipe the sulfuric acid ($H_2SO_4$) into the thermally insulated chamber, and to pipe the hydrogen iodine (HI) into the hydrogen iodine chamber. The hydrogen iodine (HI) chamber has a temperature that meets a threshold temperature (450° C.) sufficient to decompose the hydrogen iodine (HI) into the iodine ($I_2$) and hydrogen ($H_2$).

The piping in the vessel also causes the vessel to pipe the iodine ($I_2$) and the hydrogen ($H_2$) from the hydrogen iodine chamber to an iodine condenser coupled to the sulfur iodine chamber. The piping of the vessel further causes the vessel to pipe the iodine ($I_2$) from the iodine condenser to the sulfur iodine chamber and to release the hydrogen ($H_2$) from the vessel for collection and storage.

FIG. 1 illustrates a system 100 for producing hydrogen 104 ($H_2$), such as clean hydrogen ($H_2$). The system 100 includes a vessel 108 for executing the Sulfur-lodine Cycle, which is alternatively referred to as the S-I cycle. The S-I cycle has three chemical reactions to convert water 112 ($H_2O$) into the hydrogen 104 ($H_2$) and oxygen 116 ($O_2$).

The vessel 108 includes compartments (not shown) for executing the chemical reactions needed to convert the water 112 into the hydrogen 104 ($H_2$) and the oxygen 116 ($O_2$). In particular, the vessel 108 includes a thermally insulated chamber (e.g., a first chamber) that is heated with a heater 120 for controlling a temperature of the thermally insulated chamber. The thermally insulated chamber has a relatively specific heat capacity and mass, such that the thermally insulated chamber stores a large amount of heat efficiently. This high specific heat capacity (alternatively referred to as a specific heat capacitance) and mass enables the thermally insulated chamber to sustain high temperatures, even in situations where heat is pumped into the thermally insulated chamber on intermittent basis. Thus, the thermally insulated chamber provides thermal storage. The thermally insulated chamber has a maximum temperature that varies based on the discharge time, desired hydrogen production rate and the material employed to form the thermally insulated chamber. In an example where the thermally insulated chamber is formed of graphite, the maximum temperature could be about 3600° C. In some examples, the thermally insulated chamber is lined with a non-reactive material, such as alumina (e.g., a ceramic). This lining inhibits corrosion of the thermally insulated chamber that would otherwise occur due to chemical reactions occurring within. In other examples, the thermally insulated chamber is formed of solid alumina (or a material with similar thermal properties). The heater 120 is formed with resistive elements (e.g., resistors) that circumscribe an interior portion of the thermally insulated chamber. The vessel 108 also includes a sulfur iodine chamber (e.g., a second chamber) and a hydrogen iodine chamber (e.g., a third chamber).

Figure 2:
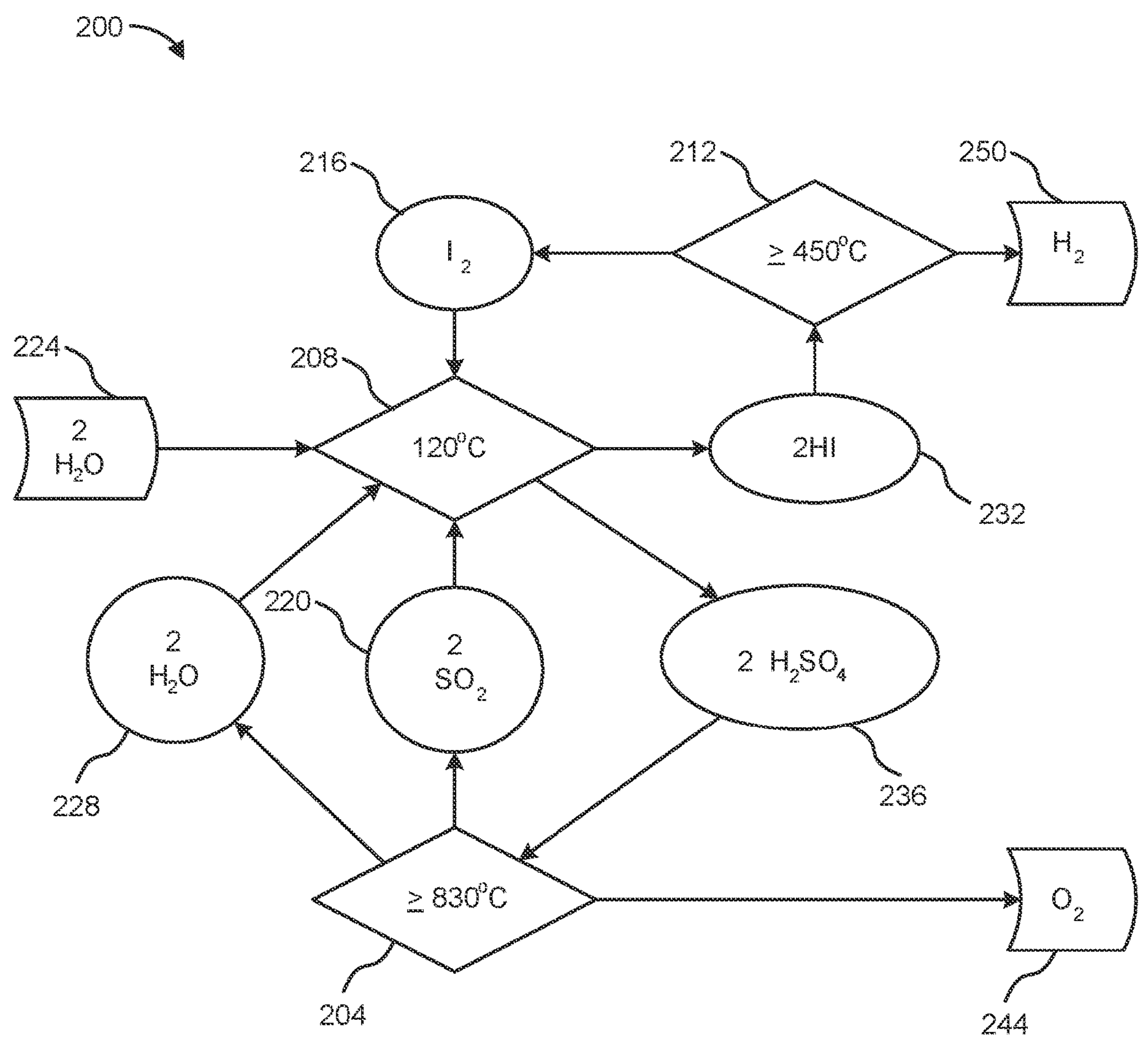
FIG. 2 illustrates a simplified chart of the sulfur-iodine (S-I) cycle.

FIG. 2 illustrates a simplified chart of the S-I cycle 200. The operations of the S-I cycle 200 can be executed by the vessel 108 of FIG. 1. In particular, the S-I cycle 200 is executed with three chemical reactions in three chambers, namely a thermally insulated chamber 204, a sulfur iodine chamber 208 and a hydrogen iodine chamber 212.

As illustrated, iodine 216, ($I_2$), sulfur-dioxide 220 ($SO_2$) and water ($H_20$) from a first water source 224 and a second water source 228 are added to the sulfur iodine chamber 208. The chemicals present in the sulfur iodine chamber 208 perform the sulfur iodine reaction characterized in Chemical Equation 1.

$$I_2+SO_2+H_2O\rightarrow 2HI+H_2SO_4 \quad \text{Chemical Equation 1:}$$

Accordingly, as demonstrated by the Chemical Equation 1, in the sulfur iodine chamber 208, the iodine 216, the sulfur-dioxide 220 and the water from the first water source 224 and the second water source 228 combined in an exothermic reaction to form hydrogen iodine 232 and sulfuric acid 236 ($H_2SO_4$) at 120° C. (248° F.).

The sulfuric acid 236 is piped to the thermally insulated chamber 204, and the hydrogen iodine 232 is piped to the hydrogen iodine chamber 212. The thermally insulated chamber 204 is heated to at least 830° C. (1526° F.), which is a first threshold temperature. The thermally insulated chamber 204 has a relatively high specific heat capacity to store large amounts of heat efficiently. In some examples, the thermally insulated chamber 204 is formed at least in part by a material such as graphite, concrete, brick, stone and/or ceramic. In some examples, the thermally insulated chamber 204 is formed with graphite and has a specific heat capacity of about 707 joules per kilogram-Kelvin (J/kg-K) and a mass of about 307,716 kg. The temperature in the thermally insulated chamber 204 causes the sulfuric acid 236 to decompose, as characterized by the Chemical Equation 2.

$$H_2SO_4\rightarrow 2SO_2+2H_2O+O_2 \quad \text{Chemical Equation 2:}$$

Accordingly, as demonstrated by Chemical Equation 2, in an endothermic reaction, the sulfuric acid 236 decomposes into the sulfur-dioxide 220, oxygen 244 ($O_2$) and provides water for the second water source 228. The water for the second water source 228 and the sulfur-dioxide 220 is piped to the sulfur iodine chamber 208. The oxygen 244 is released from the vessel as a product of the S-I cycle 200.

As noted, the hydrogen iodine 232 is piped from the sulfur iodine chamber 208 to the hydrogen iodine chamber 212. The temperature of the hydrogen iodine chamber 212 is raised to at least 450° C. (842° F.), a threshold temperature. The threshold temperature causes the hydrogen iodine 232 to decompose, as characterized by Chemical Equation 3.

$$2HI\rightarrow I_2+H_2 \quad \text{Chemical Equation 3:}$$

As demonstrated in Chemical Equation 3, in an endothermic chemical reaction, the hydrogen iodine 232 decomposes into iodine and hydrogen 250 ($H_2$). The hydrogen 250 is released from the hydrogen iodine chamber 212 as a product of the S-I cycle 200. The hydrogen 250 (clean hydrogen) can be stored in a pressurized tank (or other container) for use in hydrogen consuming equipment, such as a vehicle.

Referring back to FIG. 1, as explained with respect to FIG. 2, the decomposition of sulfuric acid ($H_2SO_4$) into sulfur dioxide ($SO_2$), water ($H_2O$) and oxygen ($O_2$) occurs in response to a temperature of the thermally insulated chamber being heated to a first threshold temperature of at least 830° C. (1526° F.). To achieve this first threshold temperature, electrical current is provided from a green energy power source 130. The green energy power source could be, for example, wind turbines, a solar panel (as illustrated), a hydroelectric generator, etc. The green energy power source 130 can provide direct current (DC) power or alternating current (AC) power depending on the implementation selected for the green energy power source 130. In each such situation, power from the green energy power source 130 could be intermittent. Stated differently, the green energy power source 130 are intermittent power sources in some examples.

The system 100 is designed such that the thermally insulated chamber remains at or above the threshold temperature (830° C.) for an interval of time (e.g., 24 hours, 12 hours, 6 hours, etc.). To achieve this, the thermally insulated chamber has a high specific heat capacity, and a controller (not shown) of the system 100 controls a flow of current from the green energy power source 130 to the heater 120. Responsive to the electrical current, the heater 120 heats the temperature of the thermally insulated chamber. Additionally, the controller receives a temperature of the thermally insulated chamber from a temperature sensor (or other device). The controller can employ the measured temperature to calculate a threshold amount of heat energy needed to maintain the thermally insulated chamber at the first threshold temperature over the interval of time. Based on the threshold amount of heat energy, the controller can selectively control the current provided from the green energy power source 130 to ensure that the temperature of the thermally insulated chamber remains at or above the first threshold temperature.

In some situations where the green energy power source 130 is implemented with wind turbines and hydroelectric generators, power output by the green energy power source 130 could be diverted to a power grid for a portion of the interval of time. For example, during times of peak usage, power from the green energy power source 130 could be applied to the power grid. Additionally or alternatively, in other situations, such as those where the green energy power source 130 is implemented with solar panels, the green energy power source 130 does not output power for a portion of the time interval (e.g., during night). In each of these examples, the green energy power source 130 provides power to the heater 120 for a portion of the interval of time, such as one-half (½), one-third (⅓), one-quarter (¼), one-fifth (⅕) or less of the interval of time (e.g., 24 hours, 12 hours, 6 hours, etc.). Stated differently, the power from the green energy power source 130 is available for the heater 120 on an intermittent basis over the interval of time. In some examples, the green energy power source 130 is unavailable to provide power over a first set of intervals of time in a given period of time (e.g., 24 hours), and is available to provide power over a second set of intervals of time over that period of time. In at least one example a combined duration of the first set of intervals of time that power is unavailable is at least twice as long as a combine duration of the second set of intervals of time that power is available. In fact, in some examples, a combined duration of the first set of intervals are 5 times greater than the combined duration of the second set of intervals of time.

As one example, the thermally insulated chamber of the vessel 108 can be charged (e.g., 120) for a charge time (during intervals of time that power is available from the green energy power source 130) that is an time interval time of about 4 hours and followed by a discharge time (e.g., unheated because power from the green energy power source 130 is unavailable) that is an interval of time about 20 hours. The charge time and the discharge time are based on a hydrogen production rate, a specific heat capacity and a mass of the thermally insulated chamber. The hydrogen production rate can be a desired hydrogen production rate that can be varied based on energy storage needs. In one example, the desired hydrogen production rate can be about 100 kilograms of hydrogen 104 per hour. However, this production rate varies based on a temperature difference between the interior of the thermally insulated chamber and a temperature of the vessel 108. In general, the production rate of the hydrogen 104 is greatest when at the end of the charge time, and decreases during the discharge time. For instance, the charge time can occur in response to the thermally insulated chamber reaching 1030° C. (about 200° C. above the first threshold temperature). In an example where the desired production rate is lowered (e.g., lowered from 100 kilograms of hydrogen 104 per hour), the discharge time can be extended.

The material employed for the thermally insulated chamber has a high specific heat capacity and a melting temperature above 830° C. Ideally, the material is also low cost and sufficiently dense to maintain a realistic overall system volume. For example, the proposed graphite system (a clean hydrogen producer) could be formed with a volume equivalent to approximately two standardized shipping containers. Lastly, the proposed system could be fully charged with 160 megawatt hours (MWh) to fully charge (over the aforementioned 4 hours) while simultaneously maintaining the reaction to decompose the sulfuric acid ($H_2SO_4$) into sulfur dioxide ($SO_2$), water ($H_2O$) and oxygen ($O_2$) as a constituent reaction for the S-I cycle during the four hours the thermally insulated chamber was charging, so the thermally insulated chamber would need access to at least 40 megawatts (MW) renewables capacity.

Accordingly, to reach a discharge time of about 20 hours (with a charge time of about 4 hours), as with a thermally insulated chamber being formed of graphite, at the end of the charge time, the heater 120 heats the thermally insulated chamber to a temperature of about 1200° C. (a second threshold temperature) or more. Moreover, continuing with the example of graphite, the controller is configured to cease the flow of current (or electrical power more generally) in response to reaching a temperature of about 3495° C. (a third threshold temperature, a maximum temperature), which is about 5% less than the melting point of graphite. More generally, the second threshold temperature is above the first threshold temperature (830° C.) and less than the melting point of the material employed to fabricate the thermally insulated chamber 320. Moreover, in various examples, these temperature can vary considerably. For example, the maximum temperature can vary based on the discharge time, the desired hydrogen production rate and the material employed to form the thermally insulated chamber 320.

To compensate for the intermittent availability of power over the interval of time, the thermally insulated chamber has a high specific heat capacity and mass, and the controller causes the green energy power source 130 to provide power sufficient to the threshold amount of heat energy over the interval of time. As one example, the thermally insulated chamber is formed of graphite and has a specific heat capacity of about 707 J/kg-K with a mass of about 307,715 kg. Because the threshold amount of heat energy is based on the thermal rate of decay of the thermally insulated chamber of the vessel 108, selectively pumping heat generated by the heater 120 in response to intermittent current from the green energy power source 130 allows the temperature of the thermally insulated chamber to remain at or above the first threshold of 830° C. for the entire interval of time. Stated differently, by providing the thermally insulated chamber, heat in the thermally insulated chamber is retained to maintain the internal temperature of the insulated chamber at or above the first threshold of 830° C. for the entire interval of time. In particular, the thermally insulated chamber is designed to impede a decay of an interior temperature for the interval of time that the intermittent power source is unavailable, such that the interior temperature remains above a first threshold temperature sufficient to decompose the sulfuric acid ($H_2SO_4$) into sulfur dioxide ($SO_2$), water ($H_2O$) and oxygen ($O_2$) as a constituent reaction for the S-I cycle over the interval of time responsive to the interior temperature reaching a second threshold temperature (e.g., above the first threshold temperature and below the third threshold temperature, which corresponds to a melting point of the material employed to fabricate the thermally insulated chamber). Accordingly, the decomposition of sulfuric acid ($H_2SO_4$) into water ($H_2O$) and sulfur dioxide ($SO_2$) continues throughout the interval of time. Therefore, the S-I cycle executed by the vessel 108 is continuously run to produce the hydrogen 104. Moreover, because the power source for the vessel 108 is the green energy power source 130, the hydrogen 104 ($H_2$) is clean hydrogen ($H_2$).

Figure 3:
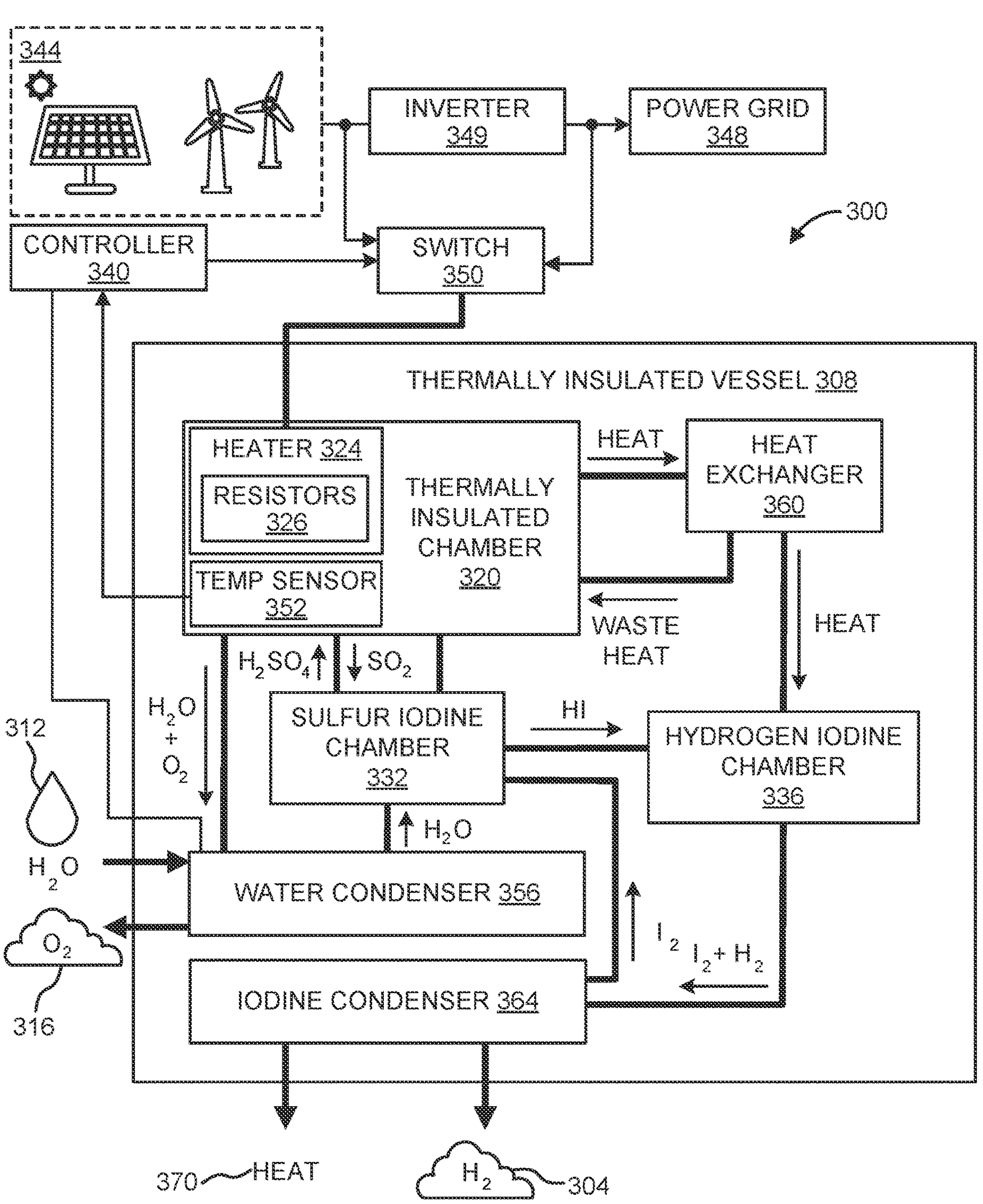
FIG. 3 illustrates another example of a system for producing hydrogen ($H_2$), such as clean hydrogen.

FIG. 3 illustrates another example of a system 300 for producing hydrogen 304 ($H_2$), such as clean hydrogen ($H_2$). The system 300 is employable to implement the system 100 of FIG. 1. The system 300 includes a vessel 308 (a thermally insulated vessel) for executing the S-I cycle (the Sulfur-Iodine Cycle). The S-I cycle has three chemical reactions to convert water 312 ($H_2O$) into the hydrogen 304 ($H_2$) and oxygen 316 ($O_2$).

The vessel 308 includes compartments for executing the chemical reactions needed to convert the water 312 into the hydrogen 304 and the oxygen 316 ($O_2$). In particular, the vessel 108 includes a thermally insulated chamber 320 (e.g., a first chamber) that is heated with a heater 324 (an electric heater). In some examples, the thermally insulated chamber 320 is lined with a nonreactive material, such as alumina (e.g., a ceramic) to inhibit corrosion that would otherwise occur due to chemical reactions. In such a situation, the lining covers regions where edges of the thermally insulated chamber 320 contacts with reactants of the sulfur-iodine cycle. In other examples, the thermally insulated chamber 320 is formed with solid alumina (or a material with similar thermal properties). The thermally insulated chamber 320 has a relatively high heat specific heat capacity and mass, indicating that the thermally insulated chamber 320 stores heat efficiently. Accordingly, the thermally insulated chamber 320 can sustain high temperatures in an interior region, even in situations where heat is pumped into the interior region on an intermittent basis. In some examples, the thermally insulated chamber 320 is formed at least in part by a material such as graphite, concrete, brick, stone and/or ceramic. In some examples, the thermally insulated chamber 320 has a specific heat capacity of about 707 J/kg-K and a mass of about 307,715 kg. More generally, the material forming the thermally insulated chamber 320 has a sufficiently specific heat capacity and mass to absorb enough heat during charging to power the production cycle until a next charging cycle. Additionally, in some examples, the material selected to form the thermally insulated chamber 320 (at least in part) has a low thermal conductivity to curtail a rate of heat loss between charging cycles but not so low that there would be insufficient heat transferred between the selected material and components of the system 300.

The heater 324 is formed with resistors 326 that circumscribe an interior portion of the thermally insulated compartment. The resistors 326 generate heat responsive to current. Thus, the temperature of the thermally insulated chamber 320 can be controlled by controlling a flow of current to heater 324 (or more specifically, current to the resistors 326). The vessel 308 also includes a sulfur iodine chamber 332 (e.g., a second chamber) and a hydrogen iodine chamber 336 (e.g., a third chamber). The thermally insulated chamber 320, the sulfur iodine chamber 332 and the hydrogen iodine chamber 336 operate in concert to execute the S-I cycle to produce the hydrogen 304.

The system 300 includes a controller 340 for controlling the flow of current between a green energy power source 344 and the heater 324. The green energy power source 344 includes green energy generators, such as solar panels, wind turbines, hydroelectric turbines, etc. The green energy power source 344 can provide direct current (DC) power or alternating current (AC) power depending on the implementation selected for the green energy power source. In various examples, the system 300 is configurable to operate with different AC and DC power ranges, multiple voltages and/or frequencies. The green energy power source 344 is configured to divert a portion of generated power to a power grid 348, and a portion to the heater 324. More particularly, in some examples (e.g., in situations where the green energy power source 344 is a solar panel), the green energy power source 344 is coupled to an inverter 349 that can convert DC power output by the green energy power source 344 into AC power consumable by the power grid 348. Additionally, a switch 350 is coupled both upstream and downstream from the inverter 349. In particular, the switch 350 has a DC input coupled to the output of the green energy power source 344 and to the input of the inverter 349, an AC input coupled to the output of the inverter 349 and to the input to (and output of) the power grid 348, such that the switch is coupled upstream from the power grid 348. The controller 340 controls a flow of AC or DC power through the inverter 349 to control the flow of electrical power to the electrical power heater 324 and the resistors 326. Accordingly, in some examples, the resistors 326 of the heater 324 are powered by (e.g., drivable by) AC and DC power, and the controller 340 switches between the AC and DC power. In other examples, the heater 324 is configured to consume only DC power or AC power. In some examples where the heater 324 is configured to consume only DC power, the switch 350 can include a rectifier for converting AC power provided from the inverter 349 and/or the power grid 348 into DC power. Conversely, in some examples where the heater 324 is configured to consume only AC power, the switch 350 can include an inverter for converting DC power output by the green energy power source 344 into AC power.

A temperature sensor 352 is situated in the thermally insulated chamber 320 to measure a real-time (e.g., within 10 seconds) temperature of an interior of the thermally insulated chamber 320. Temperature data characterizing the measured temperature of the thermally insulated chamber 320 is provided to the controller 340.

The controller 340 is representative of a computing platform. In some examples, the controller 340 is a microcontroller with embedded instructions for executing operations. In other examples, the controller 340 is implemented with a non-transitory memory that stores machine-readable instructions and a processor core (or multiple processor cores) that accesses the memory and executes the machine-readable instructions.

The system 300 also includes a water condenser 356, a heat exchanger 360 and an iodine condenser 364. In the example illustrated, the water condenser 356, the heat exchanger 360 and the iodine condenser 364 are integrated with the vessel 308. However, in other examples, the water condenser 356, the heat exchanger 360 and the iodine condenser 364 can be external to the vessel 308.

The thermally insulated chamber 320, the sulfur iodine chamber 332, the hydrogen iodine chamber 336, the water condenser 356, the heat exchanger 360 and the iodine condenser 364 have piping, as well as inlet and outlet ports to pipe chemicals and/or heat from one container to a next container or to/from an outside sink or source. The piping is represented by thick lines in the system 300.

As illustrated, the input water source provides the water 312 ($H_2O$) that is piped into the water condenser 356. The thermally insulated chamber 320 also pipes water ($H_2O$) to the water condenser 356. The water condenser 356 pipes the water ($H_2O$) to the sulfur iodine chamber 332 at a temperature of about 20° C. (68° C.). Additionally, the iodine condenser 364 pipes iodine ($I_2$) to the sulfur iodine chamber 332, and the thermally insulated chamber 320 pipes sulfur dioxide ($SO_2$) to the sulfur iodine chamber 332.

The controller 340 can control an input water source to control a flow of the water 312 into the water condenser 356. That is, the controller 340 can control a flow of the reactant for the S-I cycle executed by the system 300. In some examples, the controller 340 increases or decreases the flow of the water 312 based on a desired hydrogen production rate which, in turn, impacts the rate of consumption of the water 312 in the system 300.

The chemicals present in the sulfur iodine chamber 332 perform the sulfur iodine reaction characterized in Chemical Equation 1. Accordingly, as demonstrated by the Chemical Equation 1, in the sulfur iodine chamber 332, the iodine ($I_2$), the sulfur dioxide ($SO_2$) and the water ($H_2O$) from the water condenser 356 combine in an exothermic reaction to form hydrogen iodine (HI) gas that is above −36° C. (−33° F.) and sulfuric acid ($H_2SO_4$) below 336° C. (638° F.). The sulfuric acid ($H_2SO_4$) is piped to an inlet port of the thermally insulated chamber 320 and the hydrogen iodine (HI) is piped to the hydrogen iodine chamber 336.

As noted, the controller 340 controls the temperature of the thermally insulated chamber 320 such that the temperature of the thermally insulated chamber 320 is at least 830° C. (1526° F.), first threshold temperature. The temperature in the thermally insulated chamber 320 causes the sulfuric acid ($H_2SO_4$) to decompose into sulfur-dioxide ($SO_2$), water ($H_2O$) and oxygen ($O_2$) in an endothermic reaction as a constituent reaction of the S-I cycle. The water ($H_2O$) is piped to the water condenser 356 through a first outlet port of the thermally insulated chamber 320, and the sulfur-dioxide ($SO_2$) is piped to the sulfur iodine chamber 332 through a second outlet port of the thermally insulated chamber 320. Additionally, the thermally insulated chamber 320 pipes heat (e.g., heated gas) to the heat exchanger 360 for the hydrogen iodine chamber 336 from the heat exchanger 360. The heat can be transferred, for example, with heated gas present in the thermally insulated chamber flowing through tubes (the heated gas is any gaseous material present in the thermally insulated chamber). As the heated gas flows through the tubes, heat is conducted to the walls of the tubes. In response, the walls of the tubes transfer the heat to the gas in a cooling fluid that circulates around the tubes. The transfer of heat occurs due to the temperature difference between the gas and the fluid. As the heated gas moves through the tubes, heat gradually dissipates, causing the gas to become cooler, and is returned as waste heat to the thermally insulated chamber 320. Meanwhile, the cooling fluid absorbs heat, resulting in the cooling fluid becoming warmer as the cooling circulates around the tubes. This cooling fluid is employed to heat material in the hydrogen iodine chamber 336. In this manner, heat is transferred between the thermally insulated chamber 320 and the hydrogen iodine chamber 336 without transferring material.

Additionally, waste heat is piped from the heat exchanger 360 back to the thermally insulated chamber 320. Further, the oxygen ($O_2$) is released from the water condenser 356 and the vessel 308 as a product of the S-I cycle. The heat exchanger 360 is utilized to route the waste heat from the high temperature sulfuric acid ($H_2SO_4$) decomposition in the thermally insulated chamber 320 to the second, lower temp hydrogen iodide (HI) decomposition in the hydrogen iodine chamber 336, which enables a reduction in the amount of energy input needed from the vessel 308 to extend the discharge time. In most situations, the temperature of the waste heat would be less than the first threshold temperature of 830° C. but greater than the required hydrogen iodine (HI) decomposition temperature of 450° C. Alternatively, in other examples, the heat exchanger 360 could be omitted and heat can be provided directly to the hydrogen iodine chamber 336 by the vessel 308.

As noted, the hydrogen iodine (HI) is piped from the sulfur iodine chamber 332 to the hydrogen iodine chamber 336. The temperature of the hydrogen iodine chamber 336 is raised to at least 450° C. (842° F.). The temperature of at least 450 450° C. causes the hydrogen iodine (HI) to decompose, as characterized by Chemical Equation 3. As demonstrated in Chemical Equation 3, in an endothermic chemical reaction, the hydrogen iodine (HI) decomposes into iodine ($I_2$) and hydrogen 250 ($H_2$). The hydrogen ($H_2$) and Iodine ($I_2$) are piped to the iodine condenser 364. The iodine condenser 364 releases the hydrogen 304 ($H_2$) and heat 370 (e.g., industrial heat) from the as a product of the S-I cycle 200. Additionally, the iodine condenser 364 pipes the iodine ($I_2$) to the sulfur iodine chamber 332 for reuse, such that the S-I cycle can be a continuous process.

As demonstrated, the vessel 308 can execute the chemical reactions characterized in Chemical Equations 1-3. Thus, the vessel 308 can execute the S-I cycle. Moreover, as demonstrated by the Chemical Equations 1-3, sulfur(S) and iodine ($I_2$) are not consumed in the S-I cycle. That is, the sulfur(S) and iodine ($I_2$) are used as elements in various compounds to facilitate the production of the hydrogen 304 ($H_2$).

The system 300 is designed such that the thermally insulated chamber 320 of the vessel 308 remains at or above the first threshold temperature (830° C.) for an interval of time (e.g., 24 hours, 12 hours, 6 hours, etc.). More specifically, the thermally insulated chamber 320 of the vessel 308 is designed to impede a decay of an interior temperature for the interval of time that electrical energy from the green energy power source 344 (e.g., intermittent power source) is unavailable, such that the interior temperature of the thermally insulated chamber remains above a first threshold temperature sufficient to decompose the sulfuric acid ($H_2SO_4$) into the sulfur dioxide ($SO_2$), water ($H_2O$) and oxygen ($O_2$) for a sulfur-iodine cycle over the interval of time responsive to the interior temperature reaching a second threshold temperature. To achieve this, the controller 340 of the system 300 can employ the measured temperature from the temperature sensor 352 to calculate a threshold amount of heat energy needed to maintain the thermally insulated chamber at the first threshold temperature over the interval of time. Based on the threshold amount of heat energy, the controller 340 can selectively control the current (or electrical energy, more generally) provided from the green energy power source 344 to ensure that the temperature of the thermally insulated chamber 320 remains at or above the first threshold temperature throughout the interval of time. In particular, the controller 340 controls a flow of electrical power to the resistors 326 (e.g., heating elements) from the green energy power source 344 during a second set of intervals of time that power is available from the green energy power source 344 to cause the interior of the thermally insulated chamber 320 to reach the second threshold temperature, based on a temperature provided from the temperature sensor 352. The controller 340 can increase or decrease the flow of electrical current based on power availability from the green energy power source 344 and a desired charge speed of the thermally insulated chamber 320. For example, in situations where low-cost, excess renewables are expected to be available for an extended period of time from the green energy power source 344, the electrical current can be lower, extending the charge time. Moreover, the second threshold temperature is greater than the first threshold temperature and is sufficient to maintain the interior temperature above the first threshold temperature over a first set of intervals of time that power is unavailable from the green energy power source 344. Additionally, the controller 340 stops the flow of electrical power to the resistors 326 from the green energy power source 344 during at least one interval of time of the second set of intervals of time that power is available responsive to the interior of the thermally insulated chamber 320 reaching a third temperature threshold (e.g., a maximum temperature). In various examples, the third temperature threshold (e.g., the maximum temperature) can vary based on the discharge time, the desired hydrogen production rate and the material employed to form the thermally insulated chamber 320. As an example, the third temperature threshold can be about 3600° C. in situations where the thermally insulated chamber 320 is formed with graphite.

In some situations where the green energy power source 344 is implemented with wind turbines and hydroelectric generators, power output by the green energy power source 344 could be diverted to the power grid 348 for a portion of the interval of time. For example, during times of peak usage, power from the green energy power source 344 could be applied to the power grid 348. Additionally or alternatively, in other situations, such as those where the green energy power source 344 is implemented with solar panels, the green energy power source 344 does not output power for a portion of the time interval (e.g., during night). In each of these examples, the green energy power source 344 is available to provide power to the heater 324 for a portion of the interval of time, such as one-half (½), one-third (⅓), one-quarter (¼), one-fifth (⅕) or less of the interval of time (e.g., 24 hours, 12 hours, 6 hours, etc.). Stated differently, the power from the green energy power source 344 is available for the heater 324 on an intermittent basis over the interval of time. In some examples, the green energy power source 344 is unavailable to provide electrical power over a first set of intervals of time in a given period of time (e.g., 24 hours), and is available to provide electrical power over a second set of intervals of time over that period of time. In at least one example a combined duration of the first set of intervals of time that power is unavailable is at least twice as long (e.g., 5 times as long) as a combine duration of the second set of intervals of time that power is available. In other examples, the ratio between the combined duration of the first set of intervals of time and the second set of intervals of time can be different.

To compensate for the intermittent availability of power over the interval of time, the thermally insulated chamber 320 has a high specific heat capacity and mass, and the controller 340 causes the green energy power source 344 to provide power sufficient to meet the threshold amount of heat energy over the interval of time. Because the threshold amount of heat energy is based on the thermal rate of decay of the thermally insulated chamber of the vessel 308, selectively pumping heat generated by the heater 324 in response to intermittent current from the green energy power source 344 allows the temperature of the thermally insulated chamber 320 to remain at or above the first threshold of 830° C. for the entire interval of time. Stated differently, by providing the thermally insulated chamber 320 (e.g. thermal storage), heat in the thermally insulated chamber 320 is retained to maintain the internal temperature of the thermally insulated chamber 320 at or above the first threshold of 830° C. for the entire interval of time, such as a temperature of at least 1030° C. in some examples. Accordingly, the decomposition of sulfuric acid ($H_2SO_4$) into water ($H_2O$), sulfur dioxide ($SO_2$) and oxygen ($O_2$) continues throughout the interval of time. Therefore, the S-I cycle executed by the vessel 308 is continuously run to produce the hydrogen 304 during the interval of time. Moreover, because the power source for the vessel 308 is the green energy power source 344, the hydrogen 304 ($H_2$) is clean hydrogen ($H_2$).

In one example, the thermally insulated chamber 320 of the vessel 308 can be charged (e.g., heated by the resistors 326) for a charge time that is an time interval time of about 4 hours (e.g., an interval of time that power from the green energy power source 344 is available) and followed by a discharge time (e.g., unheated because power from the green energy power source 344 is unavailable) that is an interval of time about 20 hours. The charge time and the discharge time are based on a hydrogen production rate, a specific heat capacity and a mass of the thermally insulated chamber 320. The hydrogen production rate can be a desired hydrogen production rate that can be varied based on energy storage needs. As one example, the desired hydrogen production rate can be about 100 kilograms of hydrogen 304 per hour. In an example where the desired production rate is lower, the discharge time can be extended. However, this production rate varies based on a temperature difference between the interior of the thermally insulated chamber 320 and a temperature of the vessel 308. In general, the production rate of the hydrogen 304 is greatest when at the end of the charge time and decreases during the discharge time. For instance, the charge time can occur in response to the thermally insulated chamber 320 reaching 1030° C. (about 200° C. above the first threshold temperature).

In at least one example, the thermally insulated chamber 320 of the vessel 308 is made of 0.635 centimeters (¼ inch) aluminum oxide ceramic and is embedded within the vessel 308. In such an example, the aluminum oxide ceramic is resistance to high temperature acidic conditions. In this situation, the vessel 308 has a 50% thermal efficiency, and the vessel 308 is insulated to curtail heat loss due to outside air.

Table 1 lists 4 examples of materials employable to implement the thermally insulated chamber 320 (thermal storage medium).

TABLE 1

| EXAMPLE NO. | 1 | 2 | 3 | 4 |
|---|---|---|---|---|
| THERMAL STORAGE MEDIUM - MATERIAL | GRAPHITE | COPPER | SAND | CONCRETE |
| THEMAL STORAGE MEDIUM - MELTING POINT (° C.) | 3600 | 385 | 830 | 880 |
| THERMAL STORAGE MEDIUM - SPECIFIC HEAT (J/kg-K) | 707 | 385 | 830 | 880 |
| THERMAL STORAGE MEDIUM - MASS (kg) | 307,715 | 1,652,518 | 1,272,945 | 1,496,661 |
| THERMAL STORAGE MEDIUM - VOLUME (m^3) | 138 | 187 | 798 | 627 |
| REACTION VESSEL SURFACE AREA | 1.49 | 2.74 | 3.45 | 3.77 |

As demonstrated in Table 1, graphite, copper, sand or concrete is employable to fabricate the thermally insulated chamber 320 (and the vessel 308, more generally). Example 1 of Table 1 (graphite) has both a high specific heat capacity and a high melting temperature, which enables a significant amount of energy to be stored in the resultant thermally insulated chamber 320. By contrast, copper has a lower specific heat capacity and a lower melting point. Since the amount of thermal energy stored in the thermally insulated chamber 320 is proportional to both temperature and mass, an example of the system 300 that using copper for the thermally insulated chamber 320 would need a higher mass to store the same amount of energy as the graphite example thermally insulated chamber 320. In a similar manner for examples 3 and 4 of Table 1 sand and concrete which have similar specific heat capacities as graphite but lower melting points, indicating the mass required to store 20 hours of energy would be somewhere between that of copper and graphite.

Summarily, the material employed for the thermally insulated chamber 320 has a high specific heat capacity and a melting temperature above 830° C. Ideally, the material is also low cost and sufficiently dense to maintain a realistic overall system volume. For example, the proposed graphite system (a clean hydrogen producer) of Table 1 could be formed with a volume equivalent to approximately two standardized shipping containers. In contrast, a similarly sized green hydrogen system with a hydrogen production rate of about 100 kilograms per hour would require a 5.75 MW electrolyzer and also be equivalent to two shipping containers in volume. Lastly, the proposed system could be fully charged with 160 megawatt hours (MWh) to fully charge (over the aforementioned 4 hours) while simultaneously maintaining the reaction to decompose the sulfuric acid into sulfur dioxide, water and oxygen the four hours the thermally insulated chamber 320 was charging, so the thermally insulated chamber 320 would need access to at least 40 megawatts (MW) renewables capacity.

Accordingly, to reach a discharge time of about 20 hours (with a charge time of about 4 hours), as the first example material (graphite), at the end of the charge time, the resistors 326 of the heater 324 heat the thermally insulated chamber 320 to a temperature of about 1200° C. (a second threshold temperature). Moreover, continuing with the example of graphite, the controller 340 is configured to cease the flow of current (or electrical power more generally) in response to reaching a maximum temperature of about 3495° C. (a third threshold temperature), which is about 5% less than the melting point of graphite. Moreover, in various examples, these temperatures can vary considerably.

In some examples, power from the power grid 348 can be employed to heat the resistors 326 during time intervals that the power from the green energy power source 344 is unavailable, and this power is employable to maintain the thermally insulated chamber 320 at or above the first threshold of 830° C. for the entire interval of time. In some such situations, offsets credits can be purchased to compensate for greenhouse gases released from usage power on the power grid 348.

The hydrogen 304 ($H_2$) can be collected and stored in a pressurized tank (e.g., for hydrogen fuel cells) for subsequent use. By employing the system 300, intermittent green power, such as the power provided by the green energy power source 344 is employable to continuously produce the hydrogen 304 ($H_2$). That is, by providing the relatively high specific heat capacity and mass for the thermally insulated chamber 320, heat loss is curtailed. Instead, the heat generated by the heater 324 in response to the electrical current from the green energy power source 344 is retained and (nearly fully) leveraged to facilitate the chemical reactions for the S-I cycle, particularly, the decomposition of sulfuric acid ($H_2SO_4$) into water ($H_2O$), sulfur dioxide ($SO_2$) and oxygen ($O_2$). Accordingly, the system 300 enables a thermally efficient process for generating the hydrogen 304 ($H_2$) using intermittently available green energy.

The system 300 can achieve a high-capacity factor for the generation of clean hydrogen. The capacity factor is a ratio that represents the actual output of a power generation system over a specific period compared to a maximum potential output. In the context of green energy sources such as wind turbines or solar panels, the capacity factor indicates how efficiently the system operates and utilizes the available resources. The capacity factor is calculated by dividing the actual energy output by the maximum possible energy output if the system operated at full capacity continuously. The capacity factor is a metric for assessing the performance and economic viability of power generation systems, including the system 300. A higher capacity factor indicates more efficient utilization of the system 300, while a lower capacity factor suggests underutilization or downtime. In the present situation, by leveraging excess intermittently available electrical power generated by the green energy power source 344 to provide the clean hydrogen 304, the percentage of time that the vessel 308 generates energy (in the form of clean hydrogen) by leveraging electrical power provided by the green energy power source 344 relative to the maximum energy that can be generated by the vessel 308 is increased, such that the capacity factor is also increased. In particular, the intermittently available power generated by the green energy power source 344 is employed to continuously maintain the thermally insulated chamber 320 above the first threshold temperature that enables the S-I cycle to operate.

As one example, suppose that the green energy power source 344 is a solar panel. In this situation, during daylight hours, the solar panel is exposed to sufficient sunlight to generate electrical power. During the daylight hours, excess electrical power may be available (e.g., during off-peak times), such that the charge time is within the intervals of time that the solar panel is exposed to sufficient sunlight to generate electrical power. Conversely, at nighttime, the solar panel is not exposed to sufficient sunlight to generate electrical power. Thus, the discharge time includes the interval of time that the solar panel is not expose to sufficient sunlight to generate electrical power, which includes the nighttime. However, the vessel 308 is designed to continuously produce the hydrogen 304 ($H_2$) in the manner described, including during both the daytime and the nighttime. Thus, in some such examples, the vessel 308 is designed to continuously produce the hydrogen 304 ($H_2$) over a full 24-hour period (including daytime and nighttime cycles).

As another example, suppose that the green energy power source 344 is a wind turbine. In this situation, the wind turbine generates power whenever the wind turbine is exposed to sufficient wind to generate electrical power, which can occur over unpredictable intervals of time (both daytime and nighttime). During the intervals of time where the wind turbine is expose to sufficient wind to generate electrical power, excess electrical power may be available, such that the charge time is within the intervals of time that the wind turbine is exposed to sufficient wind to generate electrical power. Conversely, if the wind dies down, the wind turbine is not exposed to sufficient wind to generate electrical power. Thus, the discharge time includes intervals of time that the wind turbine is not expose to sufficient wind to generate electrical power, which can be unpredictable. However, the vessel 308 is designed to continuously produce the hydrogen 304 ($H_2$) in the manner described, including intervals of time that the wind turbine does not generate electrical power. Thus, in some examples, the vessel 308 is designed to continuously produce the hydrogen 304 ($H_2$) over a full 24-hour period.

Further still, as illustrated, in some examples, the heater 324 can be driven by AC power and DC power through the switch 350 that is controlled by the controller 340. In such a situation, during intervals of time that excess DC power is available from the green energy power source 344, the heater 324 is powered by DC power. Additionally, during intervals of time that electrical power is not available from the green energy power source 344 (e.g., the green energy power source 344 is not generating power or during a peak time where no excess power is available), and the temperature of the thermally insulated chamber 320 is approaching (e.g., within about 100° C. of) the first threshold temperature (e.g., about 830° C.), the controller 340 can cause the switch 350 to provide AC power to the heater 324 from the power grid 348. In these situations, offset credits can be purchased for power pulled from the power grid 348 to ensure that the hydrogen 304 ($H_2$) output by the thermally insulated vessel 308 is clean hydrogen ($H_2$).

Figure 4:
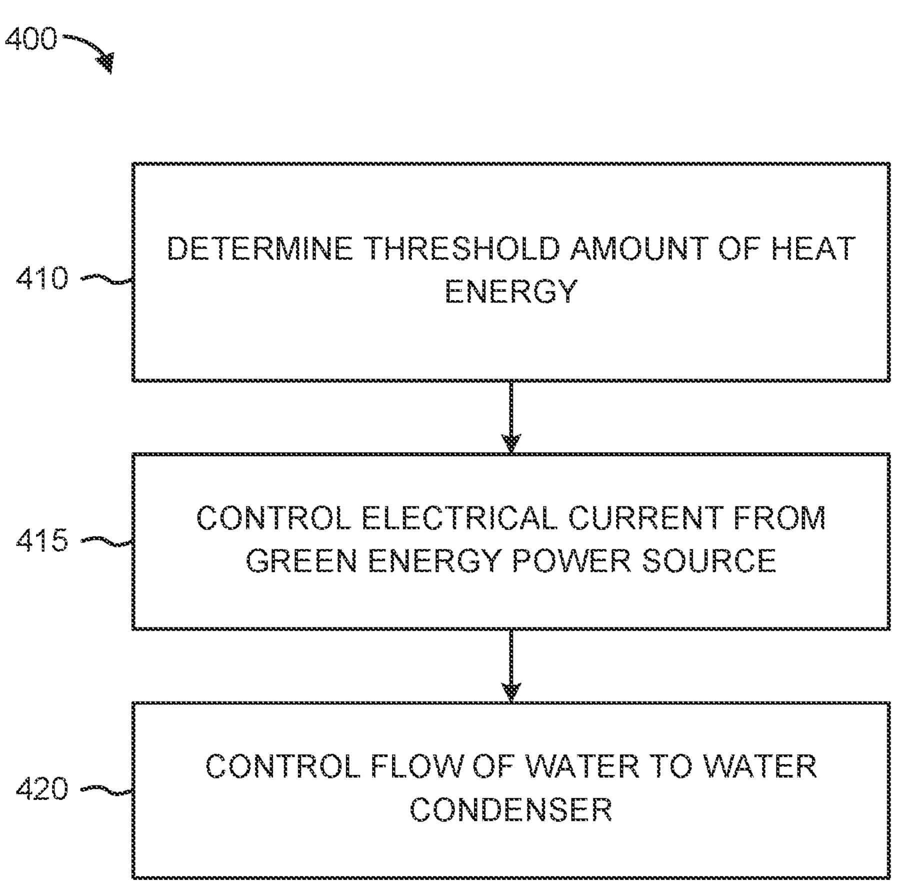
FIG. 4 illustrates a flowchart of an example method for controlling operations of a vessel for executing the S-I cycle to produce hydrogen ($H_2$).
Figure 5:
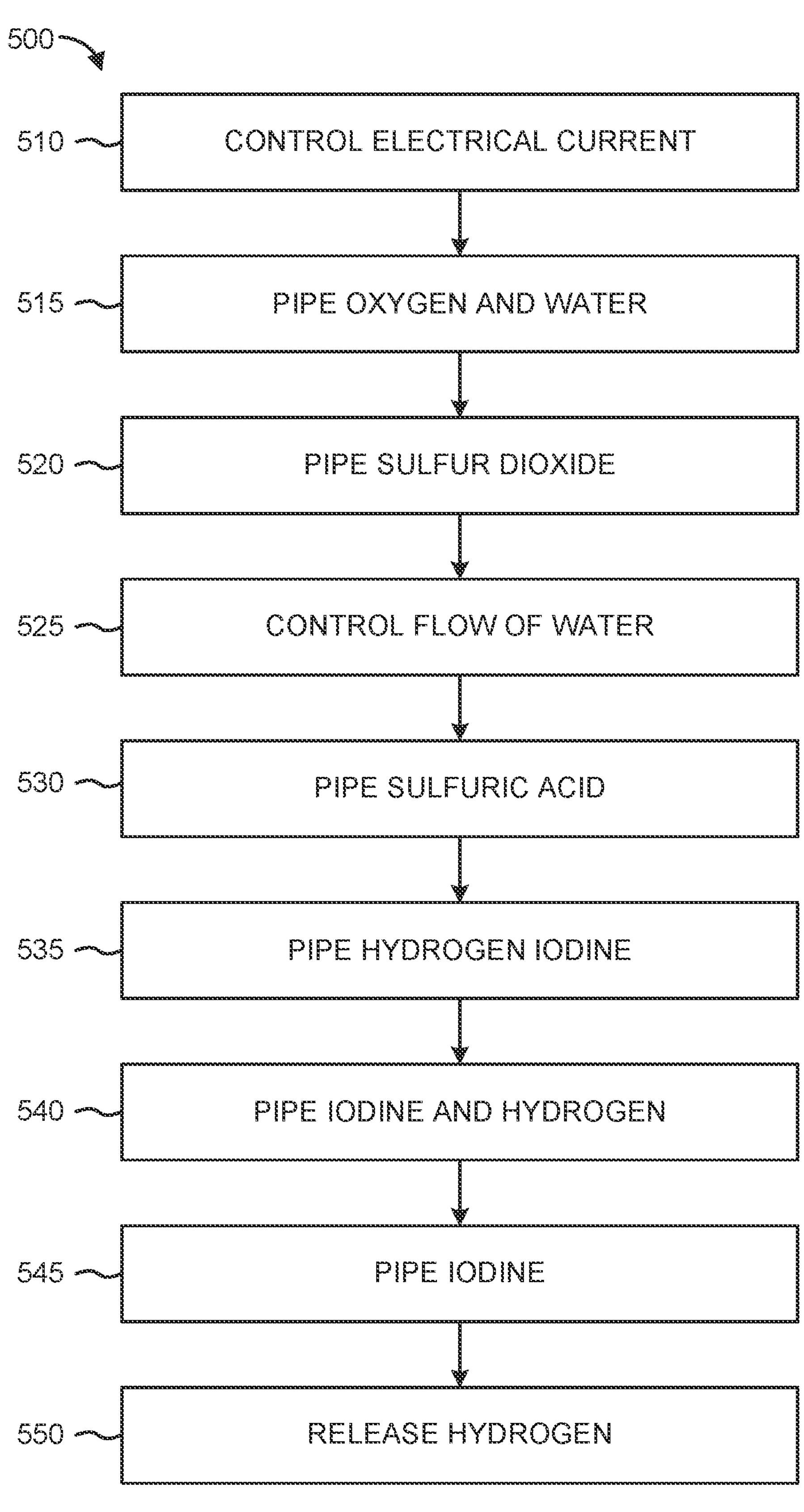
FIG. 5 illustrates a flowchart of an example method of generating hydrogen ($H_2$), such as clean hydrogen.

In view of the foregoing structural and functional features described above, example methods will be better appreciated with reference to FIGS. 4 and 5. While, for purposes of simplicity of explanation, the example methods of FIGS. 4 and 5 are shown and described as executing serially, it is to be understood and appreciated that the present examples are not limited by the illustrated order, as some actions could in occur in different orders, multiple times and/or concurrently from that shown and described herein. Moreover, it is not necessary that all described actions be performed to implement a method.

FIG. 4 illustrates a flowchart of an example method 400 for controlling operations of a vessel for executing the S-I cycle to produce hydrogen ($H_2$). The method 400 can be executed by a controller, such as the controller 340 of FIG. 3. Thus, the operations for the method 400 can be stored as machine-readable instructions for an S-I cycle controller (e.g., a software application) that are executed by a processor core to cause the processor core to execute the operations of the method 400.

At 410, the controller determines a threshold amount of heat energy needed to keep an interior temperature of a thermally insulated chamber (e.g., the thermally insulated chamber 320) of the vessel at or above a first threshold temperature (e.g., at least 830° C.) of an interval of time (e.g., 24 hours, 12 hours, 6 hours, etc.). The first threshold temperature is sufficient to decompose sulfuric acid ($H_2SO_4$) in the thermally insulated chamber into sulfur dioxide ($SO_2$), water ($H_2O$) and oxygen ($O_2$). The vessel is configured to pipe the sulfur dioxide ($SO_2$), into a sulfur iodine chamber (e.g., the sulfur iodine chamber 332) of the vessel that houses iodine ($I_2$) and to pipe the oxygen ($O_2$) and the water ($H_2O$) from the thermally insulated chamber to a water condenser (e.g., the water condenser 356). The water condenser is coupled to an input water source.

At 415, the controller controls electrical current (or the electrical power, more generally) from a green energy power source (e.g., the green energy power source 344) applied to a heater (e.g., the heater 324) for a charge time where power from the green energy power source is available to maintain the temperature of the thermally insulated chamber at or above the first threshold temperature (e.g., at least 830° C.) over a discharge time that power from the green energy source is unavailable. The basis for increasing or decreasing the flow of the electrical current depends on power availability and a desired charge speed. For example, in situations where low-cost, excess renewables are expected to be available for an extended period of time, the electrical current can be lower, extending the charge time. The heater includes resistive elements (e.g., the resistors 326), alternatively referred to as heating elements embedded in a sidewall of the thermally insulated chamber of the vessel to produce the threshold amount of heat energy during the interval of time. As one example, the controller is programmed to heat the thermally insulated chamber for a charge time of 4 hours (e.g., where power from the green energy source is available) and to allow a discharge time (e.g., where power from the green energy source is unavailable) of 20 hours over a 24 hour period. The charge time and the discharge time are based on a hydrogen production rate, a specific heat capacity and a mass of the thermally insulated chamber. The hydrogen production rate can be a desired hydrogen production rate that can be varied based on energy storage needs. The thermally insulated chamber is designed to impede a decay of an interior temperature for an interval of time that the intermittent power source is unavailable, such that the interior temperature remains at or above the first threshold temperature sufficient to decompose the sulfuric acid ($H_2SO_4$) into the sulfur dioxide ($SO_2$), water ($H_2O$) and oxygen ($O_2$) for a sulfur-iodine cycle over the interval of time responsive to the interior temperature reaching a second threshold temperature. More generally, in some examples, the controller controls a flow of electrical power to the heating elements from the intermittent power source during a second set of intervals of time that power is available from the green energy power source to cause an interior of the thermally insulated chamber to reach the second threshold temperature. The second threshold temperature is sufficient to maintain the interior temperature at or above the first threshold temperature over a first set of intervals of time that power is unavailable from the intermittent power source. Additionally, the controller stops the flow of electrical power to the heating elements from the green energy power source during at least one interval of time of the second set of intervals of time that power is available responsive to the interior of the thermally insulated chamber reaching a third temperature threshold (e.g., a maximum temperature).

At 420, the controller controls a flow of water from the input source to the water condenser. In some examples, the controller increases or decreases the flow of water based on the desired hydrogen production rate, which in turn, impacts the rate of water consumption in the system. The water flows from the water condenser to the sulfur iodine chamber, such that iodine ($I_2$), the sulfur dioxide ($SO_2$) and the water ($H_2O$) in the sulfur iodine chamber decompose into the sulfuric acid ($H_2SO_4$) and hydrogen iodine (HI), and the hydrogen ($H_2$) is output by the hydrogen iodine chamber (e.g., the hydrogen iodine chamber 336).

FIG. 5 illustrates a flowchart of an example method 500 for generating hydrogen ($H_2$), such as clean hydrogen ($H_2$). The method 500 could be implemented, for example, by the system 300 of FIG. 3 or the system 100 of FIG. 1. At 510, a controller controls electrical current applied to a heater (e.g., the heater 324) having resistive elements (e.g., the resistors 326) embedded in a sidewall of a thermally insulated chamber of a vessel (e.g., the vessel 308) to selectively heat the thermally insulated chamber (e.g., the thermally insulated chamber 320) to a temperature that meets a first threshold temperature (830° C.) for an interval of time (e.g., 24 hours, 12 hours, 6 hours, etc.). The first threshold temperature is sufficient to decompose sulfuric acid ($H_2SO_4$) into sulfur dioxide ($SO_2$), water ($H_2O$) and oxygen ($O_2$). More generally, the controller controls electrical power from a green energy power source that provides intermittently available power to the heating elements embedded in a sidewall of a thermally insulated chamber of a vessel to heat the thermally insulated chamber for a charge time (e.g., 4 hours), causing the thermally insulated chamber to remain at or above the first threshold temperature for a discharge time (e.g., 20 hours). The charge time and the discharge time are based on a hydrogen production rate, a specific heat capacity and a mass of the thermally insulated chamber. The hydrogen production rate can be a desired hydrogen production rate that can be varied based on energy storage needs.

At 515, the oxygen ($O_2$) and the water ($H_2O$) are piped from the first chamber to a water condenser (e.g., the water condenser 356). The water condenser is coupled to an input water source. At 520, the sulfur dioxide ($SO_2$) is piped into a sulfur iodine chamber (e.g., the sulfur iodine chamber 332) of the vessel that houses iodine ($I_2$). At 525, the controller controls a flow of water ($H_2O$) from the input source to the water condenser. The water ($H_2O$) flows from the water condenser to the sulfur iodine chamber. Iodine ($I_2$), the sulfur dioxide ($SO_2$) and the water ($H_2O$) in the sulfur iodine chamber combine (through chemical displacement) into the sulfuric acid ($H_2SO_4$) and hydrogen iodine (HI).

At 530, the sulfuric acid ($H_2SO_4$) is piped into the first chamber (for the decomposition at 510). At 535, the hydrogen iodine (HI) is piped into a hydrogen iodine chamber (e.g., the hydrogen iodine chamber 336) of the vessel. The hydrogen iodine chamber has a temperature that meets a threshold temperature (450° C.) sufficient to decompose the hydrogen iodine (HI) into the iodine ($I_2$) and hydrogen ($H_2$).

At 540, the iodine ($I_2$) and the hydrogen ($H_2$) are piped from the hydrogen iodine chamber to an iodine condenser (e.g., the iodine condenser 364) coupled to the sulfur iodine chamber. At 545, the iodine ($I_2$) is piped from the iodine condenser to the sulfur iodine chamber. At 550, the hydrogen ($H_2$) is released from the vessel for storage.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine-readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices and magnetic storage devices.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements. Further, where the disclosure or claims recite "a set" of elements, it should be interpreted as a set of one or more such elements, neither requiring nor excluding two or more such elements in the set of elements.

What is claimed is:

1. A system for producing hydrogen, the system comprising:

a thermally insulated chamber comprising:

a sidewall formed of thermally insulative material;

heating elements embedded in the sidewall, wherein the heating elements are coupled to an intermittent power source, and the heating elements heat an interior of the thermally insulated chamber responsive to electrical power from the intermittent power source;

an inlet port for receiving sulfuric acid from a sulfur-iodine chamber;

a first outlet port for piping sulfur dioxide into the sulfur-iodine chamber; and a second outlet port for piping hydrogen and water into a water condenser; and a controller that controls a flow of electrical power from the intermittent power source to the heating elements based on an interior temperature of the thermally insulated chamber;

wherein the thermally insulated chamber is designed to impede a decay of the interior temperature for an interval of time that the intermittent power source is unavailable, such that the interior temperature remains at or above a threshold temperature sufficient to decompose the sulfuric acid into the sulfur dioxide, oxygen and hydrogen for a sulfur-iodine cycle over a discharge time.

2. The system of claim 1, wherein the controller controls a flow of electrical power to the heating elements from the intermittent power source during a first set of intervals of time that power is available from the intermittent power source to heat the interior of the thermally insulated chamber for a charge time, wherein the interior temperature of the thermally insulated chamber is sufficient to maintain the interior temperature at or above the threshold temperature over a second set of intervals of time that power is unavailable from the intermittent power source.

3. The system of claim 2, wherein the controller ceases the flow of electrical power to the heating elements from the intermittent power source during at least one interval of time of the first set of intervals of time that power is available responsive to the interior of the thermally insulated chamber reaching a maximum temperature that is based on a melting point of material forming the thermally insulated chamber.

4. The system of claim 2, wherein the charge time is based on a desired hydrogen production rate and a mass of the thermally insulated chamber.

5. The system of claim 4, wherein the charge time is further based on a specific heat capacity of the thermally insulated chamber.

6. The system of claim 5, wherein the thermally insulated chamber is formed with graphite.

7. The system of claim 2, wherein the charge time is less than the discharge time.

8. The system of claim 2, wherein a combined duration of the second set of intervals of time that power is unavailable is at least three times as long as a combine duration of the first set of intervals of time that power is available.

9. The system of claim 1, wherein the intermittent power source is a green energy power source that generates electrical power.

10. The system of claim 9, wherein the green energy power source is a solar panel and a charge time is during an interval of time that the solar panel is exposed to sufficient sunlight to generate electrical power, and the discharge time is during an interval of time that the solar panel does not generate power.

11. The system of claim 9, wherein the green energy power source is a wind turbine, and a charge time is during an interval of time that the wind turbine is exposed to sufficient wind to generate electrical power, and the discharge time is during an interval of time that the wind turbine does not generate power.

12. The system of claim 1, wherein the intermittent power source includes a green energy power source and a power grid, and the controller draws electrical power from the power grid during intervals of time that power is unavailable from the green energy power source and the interior temperature of the thermally insulated chamber is approaching the threshold temperature.

13. The system of claim 12, further comprising an inverter coupled to the green energy power source and the power grid, wherein the heating elements are configured to consume alternating current (AC) power and direct current (DC) power.

14. The system of claim 1, wherein the thermally insulated chamber is lined with alumina to inhibit corrosion of the thermally insulated chamber.

15. The system of claim 1, further comprising a heat exchanger coupled to the thermally insulated chamber and a hydrogen iodine chamber, wherein heat is transferred from the interior of the thermally insulated chamber to the hydrogen iodine chamber, and waste heat is returned to the thermally insulated chamber.

16. The system of claim 15, further comprising an iodine condenser coupled to the hydrogen iodine chamber, wherein:

the sulfur-iodine chamber receives the sulfur dioxide from the thermally insulated chamber, and water from the water condenser, and the sulfur-iodine chamber provides the sulfuric acid to the thermally insulated chamber, and provides hydrogen iodine to the hydrogen iodine chamber;

the water condenser receives the water and the hydrogen from the thermally insulated chamber, receives water from an external source, provides the water from the water condenser and releases oxygen;

the hydrogen iodine chamber receives the hydrogen iodine from the sulfur-iodine chamber and provides iodine and hydrogen to the iodine condenser; and the iodine condenser receives the iodine and the hydrogen from the iodine condenser and releases clean hydrogen.

17. The system of claim 16, wherein the clean hydrogen is stored in a pressurized tank.

* * * * *